United States Patent
Harrison et al.

(10) Patent No.: US 8,733,429 B2
(45) Date of Patent: May 27, 2014

(54) HYBRID HEATING AND/OR COOLING SYSTEM

(75) Inventors: Jeffrey J Harrison, Naples, ME (US); William A Turner, Harrison, ME (US)

(73) Assignee: The H.L. Turner Group, Inc., Harrison, ME (US)

(*) Notice: Subject to any disclaimer, the term of this patent is extended or adjusted under 35 U.S.C. 154(b) by 1253 days.

(21) Appl. No.: 11/674,241

(22) Filed: Feb. 13, 2007

(65) Prior Publication Data

US 2007/0205298 A1    Sep. 6, 2007

Related U.S. Application Data

(60) Provisional application No. 60/772,759, filed on Feb. 13, 2006.

(51) Int. Cl.
F25B 29/00    (2006.01)
F25B 27/00    (2006.01)

(52) U.S. Cl.
USPC .......... 165/240; 165/254; 165/260; 165/48.1; 165/48.2; 165/45; 62/235.1

(58) Field of Classification Search
USPC .......... 165/240, 254, 260, 47, 48.1, 48.2, 45; 62/235.1
See application file for complete search history.

(56) References Cited

U.S. PATENT DOCUMENTS

| | | | |
|---|---|---|---|
| 2,713,252 A | 7/1955 | Jackson | |
| 3,262,493 A * | 7/1966 | Hervey | 165/45 |
| 3,563,304 A | 2/1971 | McGrath | |
| 3,949,732 A | 4/1976 | Reines | |
| 3,965,972 A * | 6/1976 | Petersen | 165/45 |
| 3,980,130 A * | 9/1976 | Thomason et al. | 165/48.2 |
| 4,010,731 A * | 3/1977 | Harrison | 165/45 |
| 4,062,489 A | 12/1977 | Henderson | |
| 4,064,705 A * | 12/1977 | Edwards et al. | 62/238.2 |
| 4,099,381 A | 7/1978 | Rappoport | |
| 4,169,554 A * | 10/1979 | Camp | 165/48.2 |
| 4,187,687 A * | 2/1980 | Savage | 62/238.2 |
| 4,205,718 A * | 6/1980 | Balch | 165/45 |
| 4,207,744 A * | 6/1980 | Takeshita et al. | 62/235.1 |
| 4,232,820 A * | 11/1980 | Ritter et al. | 62/235.1 |
| 4,256,475 A * | 3/1981 | Schafer | 165/48.2 |
| 4,269,167 A * | 5/1981 | Embree | 137/59 |
| 4,270,359 A * | 6/1981 | Hummel | 62/235.1 |
| 4,284,064 A * | 8/1981 | Midouhas | 126/630 |
| 4,299,277 A * | 11/1981 | McGregor | 165/48.2 |
| 4,313,424 A * | 2/1982 | Schreyer et al. | 126/636 |
| 4,336,692 A * | 6/1982 | Ecker et al. | 165/240 |
| 4,344,414 A * | 8/1982 | Balch | 165/45 |
| 4,350,200 A * | 9/1982 | McElwain | 165/48.2 |

(Continued)

*Primary Examiner* — Ljiljana Ciric
(74) *Attorney, Agent, or Firm* — Grossman Tucker Perreault & Pfleger, PLLC (57) ABSTRACT

A hybrid heating and/or cooling system may combine different energy sources (e.g., solar and geothermal) into a single system. The hybrid heating and/or cooling system may include one or more heat pumps, a heat exchanger system, a solar and/or waste energy system, and a delivery system for delivering heat (and/or cool air) to a space such as a building. These systems may be interconnected and controlled using various conduits, pumps, valves and controls. The solar energy system may provide heat (e.g., low grade heat) to the working fluid at the input to the source side of the heat pump and/or may provide heat (e.g., high grade heat) to the delivery system for direct solar and/or waste energy heating.

10 Claims, 6 Drawing Sheets

(56) References Cited

U.S. PATENT DOCUMENTS

| | | | |
|---|---|---|---|
| 4,385,625 A * | 5/1983 | Lee | 126/636 |
| 4,425,906 A * | 1/1984 | Ingestrom | 165/240 |
| 4,429,540 A * | 2/1984 | Burnham | 62/235.1 |
| 4,432,147 A * | 2/1984 | Chen et al. | 34/542 |
| 4,438,881 A * | 3/1984 | Pendergrass | 62/235.1 |
| 4,452,229 A * | 6/1984 | Powers | 165/45 |
| 4,458,669 A * | 7/1984 | Lee | 126/640 |
| 4,507,936 A * | 4/1985 | Yoshino | 62/235.1 |
| 4,551,987 A * | 11/1985 | Cutlip | 62/238.7 |
| 4,566,281 A * | 1/1986 | Sandrock et al. | 165/47 |
| 4,674,476 A * | 6/1987 | Wilson | 165/45 |
| 4,693,089 A * | 9/1987 | Bourne et al. | 62/238.6 |
| 4,787,444 A * | 11/1988 | Countryman | 165/48.2 |
| 4,798,056 A * | 1/1989 | Franklin | 62/235.1 |
| 5,177,977 A * | 1/1993 | Larsen | 62/235.1 |
| 5,941,238 A * | 8/1999 | Tracy | 165/48.2 |
| 6,450,247 B1 * | 9/2002 | Raff | 165/45 |
| 6,681,593 B1 * | 1/2004 | Gundlach | 62/324.1 |
| 6,775,999 B2 * | 8/2004 | Wilkinson | 62/235.1 |
| 7,451,611 B2 * | 11/2008 | Muscatell | 62/235.1 |
| 7,900,450 B2 * | 3/2011 | Gurin | 60/641.2 |
| 7,992,631 B2 * | 8/2011 | Brett | 165/254 |
| 8,047,905 B2 * | 11/2011 | Everett et al. | 165/45 |
| 2009/0308566 A1 * | 12/2009 | Simka | 62/235.1 |

* cited by examiner

HYBRID HEATING AND/OR COOLING SYSTEM

CROSS-REFERENCE TO RELATED APPLICATIONS

This application claims the benefit of co-pending U.S. Provisional Patent Application Ser. No. 60/772,759, filed on Feb. 13, 2006, which is fully incorporated herein by reference.

TECHNICAL FIELD

The present invention relates to heating and/or cooling systems and more particularly, to a hybrid heating and/or cooling system utilizing solar and geothermal energy.

BACKGROUND INFORMATION

In general, there is a need to develop heating and/or cooling systems that are more environmentally friendly and that are less reliant on fossil fuels. Some existing systems have used alternative energy forms, such as solar and geothermal energy, to provide heating and/or cooling in a building. In some existing systems, a combined group of systems (e.g., solar and geothermal) may each take a turn at heating when appropriate heat is available. Such combined systems where solar and geothermal systems are operating independently, however, may not maximize efficiency.

BRIEF DESCRIPTION OF THE DRAWINGS

These and other features and advantages will be better understood by reading the following detailed description, taken together with the drawings wherein.

DETAILED DESCRIPTION

Figure 1:
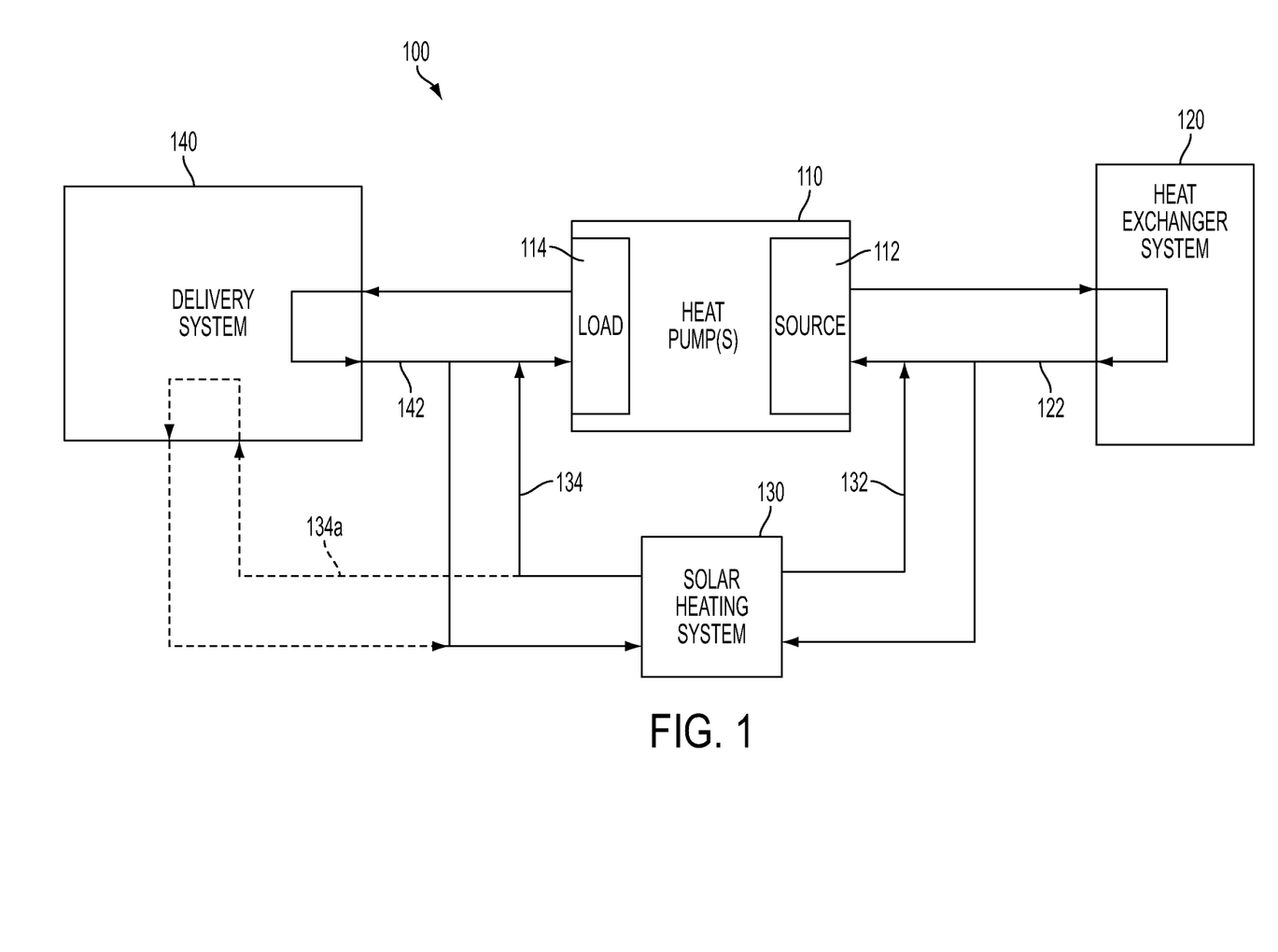
FIG. 1 is a functional block diagram of a hybrid heating and/or cooling system, consistent with one embodiment of the present invention.

Referring to FIG. 1, a hybrid heating and/or cooling system 100, consistent with one embodiment of the present invention, is shown and described generally. The hybrid heating and/or cooling system 100 may combine different energy sources (e.g., solar and geothermal) into a single system. The hybrid heating and/or cooling system 100 may generally include one or more heat pumps 110, a heat exchanger system 120, a solar/waste energy system 130, and a delivery system 140 for delivering heat (and/or cool air) to a space such as a building. As will be described in greater detail below, these systems may be interconnected and controlled using various conduits, pumps, valves and controls. The various components may be arranged in a combined hybrid configuration that allows the heat pump(s) 110 to operate at or near peak efficiency operating point when operated or that bypasses the heat pump(s) 110 for direct waste energy and/or solar heating when high grade solar or waste energy stored heat is available.

The heat pump(s) 110 may include a source side 112 and a load side 114. The heat pump(s) 110 may move heat between the source side 112 and the load side 114 during a heating mode, for example, using a vapor-compression refrigeration cycle. The heat pump(s) 110 may include a refrigeration heat pump unit known to those skilled in the art, which generally includes a condenser, expansion valve, evaporator, and compressor. The heat pump(s) 110 may also include a reversing valve and evaporation-condenser coils located so that the same heat pump 110 can operate in a cooling mode where heat is moved from the load side 114 to the source side 112. The heat pump(s) 110 may transfer the heat to and/or from working fluids that pass through the source side 112 and the load side 114.

The heat exchanger system 120 may include one or more heat exchangers positioned at a heat source, such as a geothermal heat source or an effluent heat source in a waste treatment facility. The heat exchanger system 120 provides a heat exchanger working fluid 122 to the source side 112 of the heat pump(s) 110. When the heat pump 110 is operating in heating mode, the heat exchanger working fluid 122 provides heat to the source side 112 of the heat pump 110, which may be moved to the load side 114 of the heat pump 110. When the heat pump 110 is operating in a cooling mode and heat flow is reversed, the heat exchanger working fluid 122 may carry rejected heat from the source side 112 of the heat pump 110 to the heat exchanger(s) in the heat exchanger system 120.

The solar/waste energy heating system 130 may collect and store heat from solar energy and/or sources of waste heat. The heating system 130 may provide heat (e.g., low grade heat) for tempering the working fluid at the source side 112 and/or the load side 114 of the heat pump 110 and/or may provide heat (e.g., high grade heat) directly to the delivery system 140. For example, a solar/waste energy heated working fluid 132 may be provided from the heating system 130 to the heat exchanger working fluid 122 at the input to the source side 112 of the heat pump 110. A solar/waste energy heated working fluid 134 may optionally be provided from the heating system 130 to the delivery system working fluid 142 at the input to the load side 114 of the heat pump 110. The solar/waste energy heating working fluid 134 may be used to temper the delivery system working fluid 142 or may be passed through the heat pump 110 to provide direct solar/waste energy heating. By tempering the working fluids provided to the heat pump(s) 110, the heating system 130 may be used to minimize work done by the heat pump(s) 110 to improve the efficiency of the heat pump(s) 110. Alternatively or additionally, a heated working fluid 134a may also be provided directly to the delivery system 140 for direct heating.

The delivery system 140 may include space heating and/or cooling equipment, such as existing building heating and cooling equipment (e.g., air handlers and convection heating equipment). The delivery system working fluid 142 may be passed from the load side 114 of the heat pump 110 through the delivery system 140 to provide heating and/or cooling. The delivery system 140 may also include other supplemental heat sources, such as fuel fired boilers. One or more peaking fuel-fired boilers may be used to supplement low grade heat sources, for example, during building warm up cycles or near design day weather. The use of peaking boilers to provide high grade heat during high heat demand may keep equipment costs down in larger systems.

Figure 2:
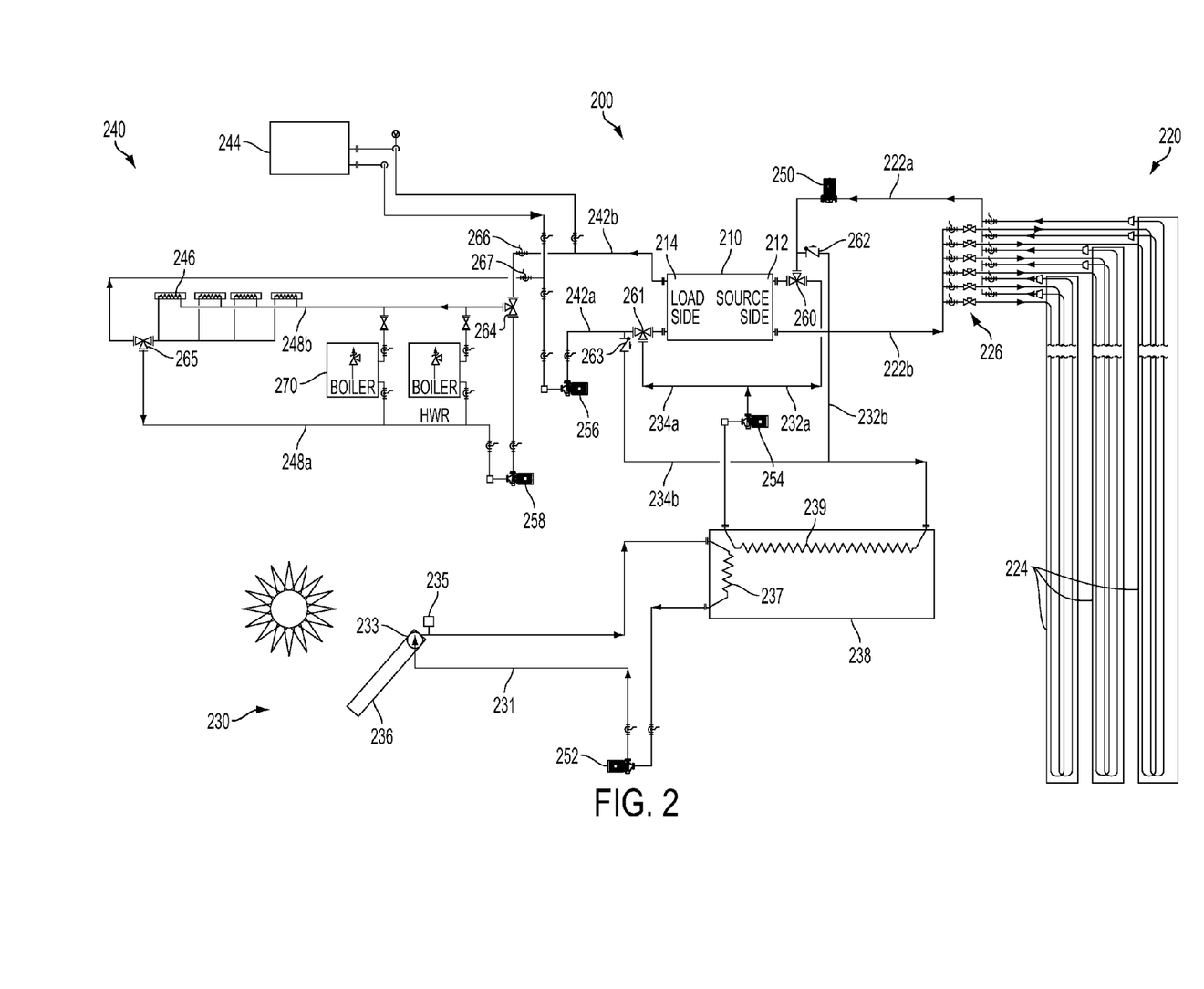
FIG. 2 is a schematic diagram of a hybrid heating and/or cooling system, consistent with another embodiment of the present invention.

Referring to FIG. 2, a hybrid heating and/or cooling system 200, consistent with another embodiment of the present invention, is shown and described in greater detail. This embodiment of the hybrid heating and/or cooling system 200 may be used with a geothermal heat source and may be used for heating and/or cooling a building. The system 200 may include a heat pump 210 having a source side 212 and a load side 214. A heat exchanger system 220 may be coupled to the source side 212 of the heat pump 210, a solar heating system 230 may be coupled to the source side 212 and/or the load side 214 of the heat pump 210, and a delivery system 240 may be coupled to the load side 214 of the heat pump 210.

The heat exchanger system 220 may be coupled to the heat pump 210 with conduits 222a, 222b carrying the heat exchanger working fluid. The heat exchanger system 220 may include borehole heat exchangers 224 positioned in geothermal wells (e.g., in a heat exchanger field). The borehole heat exchangers 224 may have a variety of designs. In one embodiment, closed loop borehole heat exchangers may be used, particularly for larger systems to be more environmentally sustainable. Open loop systems may also be used and may be more cost effective, for example, for smaller systems with lower environmental impact. Depending upon the local geology and water table, the borehole heat exchangers 224 may have different orientations (e.g., vertical or horizontal) and depths. In one example, the borehole heat exchangers 224 may be located in deep geothermal wells of about 900 feet deep with grout filling at about the first 300 feet. Although a double U tube configuration is shown, other configurations such as concentric piping may also be employed. Other forms of geothermal energy transfer may also be used.

The heat exchanger system 220 may also include valves 226 coupling the heat exchangers 224 to the conduits 222a, 222b. A pump 250 may be coupled to one of the conduits 222a to pump heat exchanger working fluid through the heat exchangers 224 and the source side 212 of the heat pump 210. In one exemplary embodiment, the heat exchanger working fluid may be supplied to the input of the source side 212 of the heat pump 210 through conduit 222a with a temperature of about 43° F. to 56° F. and may be returned to the heat exchangers 224 through the conduit 222b with a temperature of about 41° F. to 44° F. In one exemplary embodiment, the heat exchanger working fluid may be tempered to a temperature of about 55° F. at the input to the source side 212 of the heat pump 210 using solar heated working fluid, as described below.

The solar heating system 230 may be coupled to the source side 212 and to the load side 214 of the heat pump 210 with conduits 232a, 232b, 234a, 234b carrying the solar heated working fluid. The solar heating system 230 may include one or more solar collectors 236 for collecting the solar energy and one or more solar heat storage tanks 238 for storing the heat generated from the solar energy. The solar collector(s) 236 may be coupled to the solar heat storage tank(s) 238 via a conduit 231 that allows a solar collector working fluid to flow between the solar collector(s) 236 and the solar heat storage tank(s) 238. A pump 252 may be coupled to the conduit 231 to cause the working fluid to flow from the storage tank(s) 238 to the solar collector(s) 236, for example, when a control device 235 indicates that solar collection is possible.

According to one embodiment, the solar collector(s) 236 may include heat pipe units 233, such as vacuum tube heat pipe units, that provide the heat transfer from solar energy to the solar collector working fluid. In one example, the solar collector(s) 236 may have an average collection efficiency of about 70%. The solar collector(s) 236 may be coupled to the solar heat storage tank(s) 238 in a drainback type arrangement with water as the working fluid. The solar collector(s) 236 may also be coupled to the solar heat storage tank(s) 238 in a closed loop arrangement with an antifreeze solution, such as glycol, as the working fluid. In a closed loop arrangement, the solar heat storage tank(s) 238 may include an optional first heat exchanger 237. Alternatively, the water may drain directly into the solar heat storage tank(s) 238.

One embodiment of the solar heat storage tank 238 may include a second optional heat exchanger 239 to isolate the water or other fluid in the solar heat storage tank(s) 238 from the rest of the system. In other embodiments, a single working fluid may flow from the solar collector(s) 236 to the solar storage tank(s) 238 and into the conduits 232a, 234a. In one embodiment, the solar collector(s) 236 and storage tank(s) 238 may be sized to maintain about 110° F. as a minimum water temperature with some very short spikes that may approach about 60° F.

A pump 254 may be coupled to the solar heat storage tank(s) 238 to cause the solar heated working fluid to flow from the solar heat storage tank(s) 238 into the conduits 232a, 234a and subsequently into the input of the source side 212 and/or the load side 214 of the heat pump 210. Three-way valves 260, 261 may be used, for example, to couple the conduits 232a, 234a to the conduits 222a, 242a, respectively, carrying the heat exchanger working fluid and the delivery system working fluid. The solar heating system 230 may thus be used to temper the working fluid input to the heat pump 210 in a hybrid heating mode and/or to provide direct heating to the delivery system 240 in a direct solar heating mode, as will be described in greater detail below. Instead of or in addition to the valves 260, 261 other devices, such as heat exchangers, may be used to provide the heat from the solar heated working fluid to the heat exchanger working fluid for tempering. The conduits 232b, 234b may be coupled to the conduits 222a, 242a by way of check valves 262, 263 to allow the solar heated working fluid to return to the solar heat storage tank(s) 238. In one exemplary embodiment, the solar heated working fluid may be supplied from the solar heat storage tank(s) 238 at a temperature in a range of about 110° F. to 200° F. and may be returned to the solar heat storage tank(s) 238 at a temperature in a range of about 48° F. to 70° F. In one exemplary embodiment, the solar heated working fluid may be provided for direct solar heating when the temperature in the solar heat storage tank exceeds 160° F.

The delivery system 240 may be coupled to the load side 214 of the heat pump 210 via conduits 242a, 242b carrying the delivery system working fluid. According to the exemplary embodiment, the delivery system 240 includes one or more air handler units 244 and a convection heating system including one or more baseboard heating units 246. The air handler unit(s) 244 may be equipped with coils sized for utilization of the low grade heat received from the heat pump 210. Convection heating equipment may also include any combination of radiant flooring or baseboard hydronic fin tube heating elements. A pump 256 may be coupled to one of the conduits 242a to cause delivery system working fluid to be provided to the input of the load side 214 of the heat pump 210. In one exemplary embodiment, the delivery system working fluid may be supplied from the heat pump 210 at a temperature of about 95° F. and may be returned to the heat pump 210 at a temperature of about 70° F., which may be tempered to provide a temperature of about 85° F. at the input of the load side 214 of the heat pump 210.

In one embodiment, one or more fuel fired peaking boilers 270 may be coupled to at least the baseboard heat unit(s) 246 or other convection heating system, for example, by way of conduits 248a, 248b forming a convention loop. The peaking boilers 270 may be used in a peaking boiler heating mode, as described in greater detail below. A pump 258 may be coupled to one of the conduits 248a to cause a working fluid to flow from the peaking boiler(s) 270 through the baseboard heat unit(s) 246 or other convection heating equipment. In on exemplary embodiment, the working fluid may be provided through the convection loop at a temperature in a range of about 95° F. to 180° F. The convection loop may be isolated using isolation valves 264, 265, for example, so that the heat pump 210 and/or solar heating system 230 may be used with other sections of the delivery system 240 such as the air handler unit(s) 244 when the boilers 270 are operating. The delivery system 240 may also include valves 266, 267, which may be used to isolate the convention heating loop, for example, when operating in a cooling mode, as described in greater detail below. In other embodiments of this system, more valves may be used to isolate building heating equipment loops individually and/or to completely bypass the heat pump(s) 210.

Figure 3A:
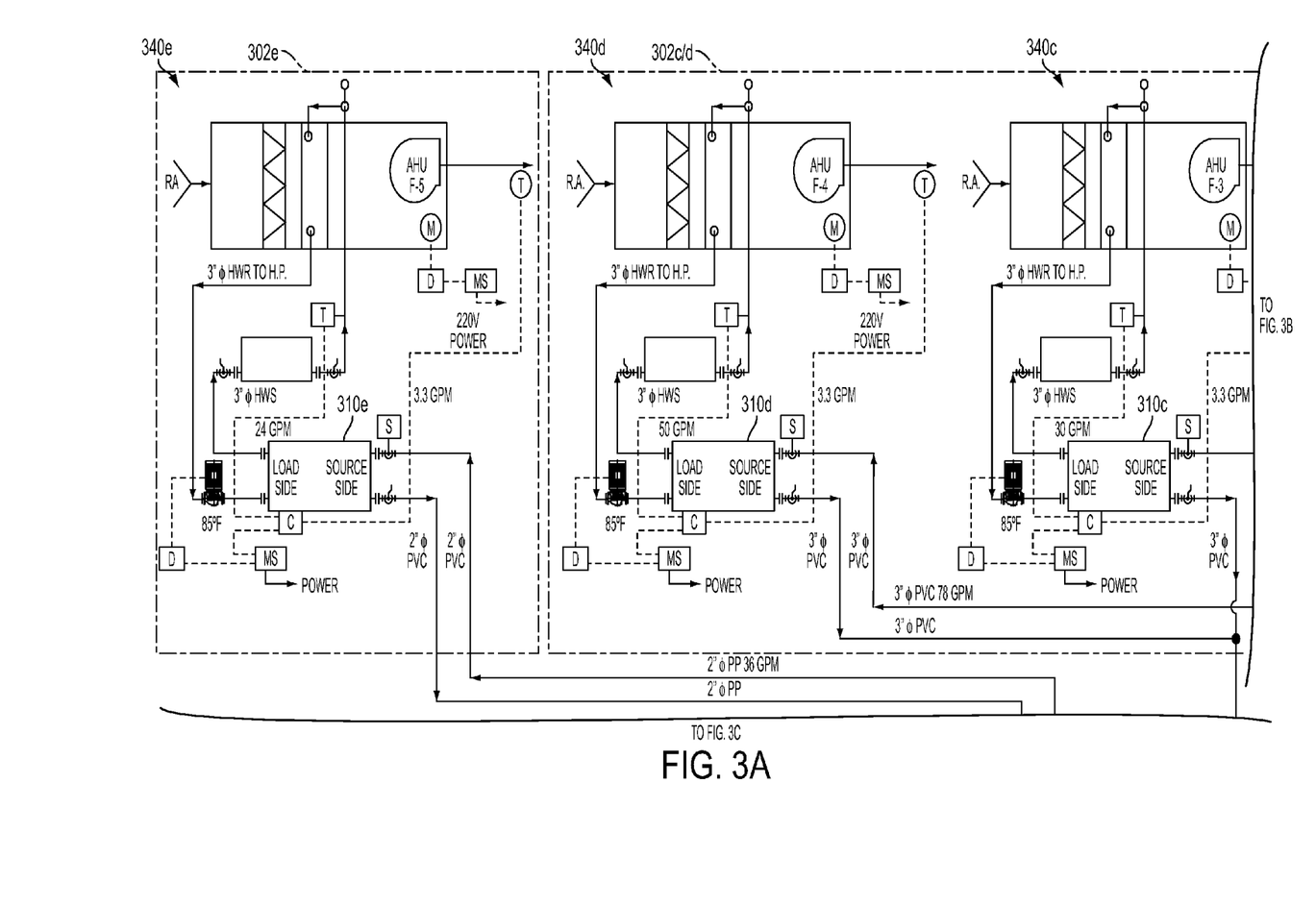
FIGS. 3A-3C are schematic diagrams of a hybrid heating and/or cooling system, consistent with a further embodiment of the present invention.
Figure 3B:
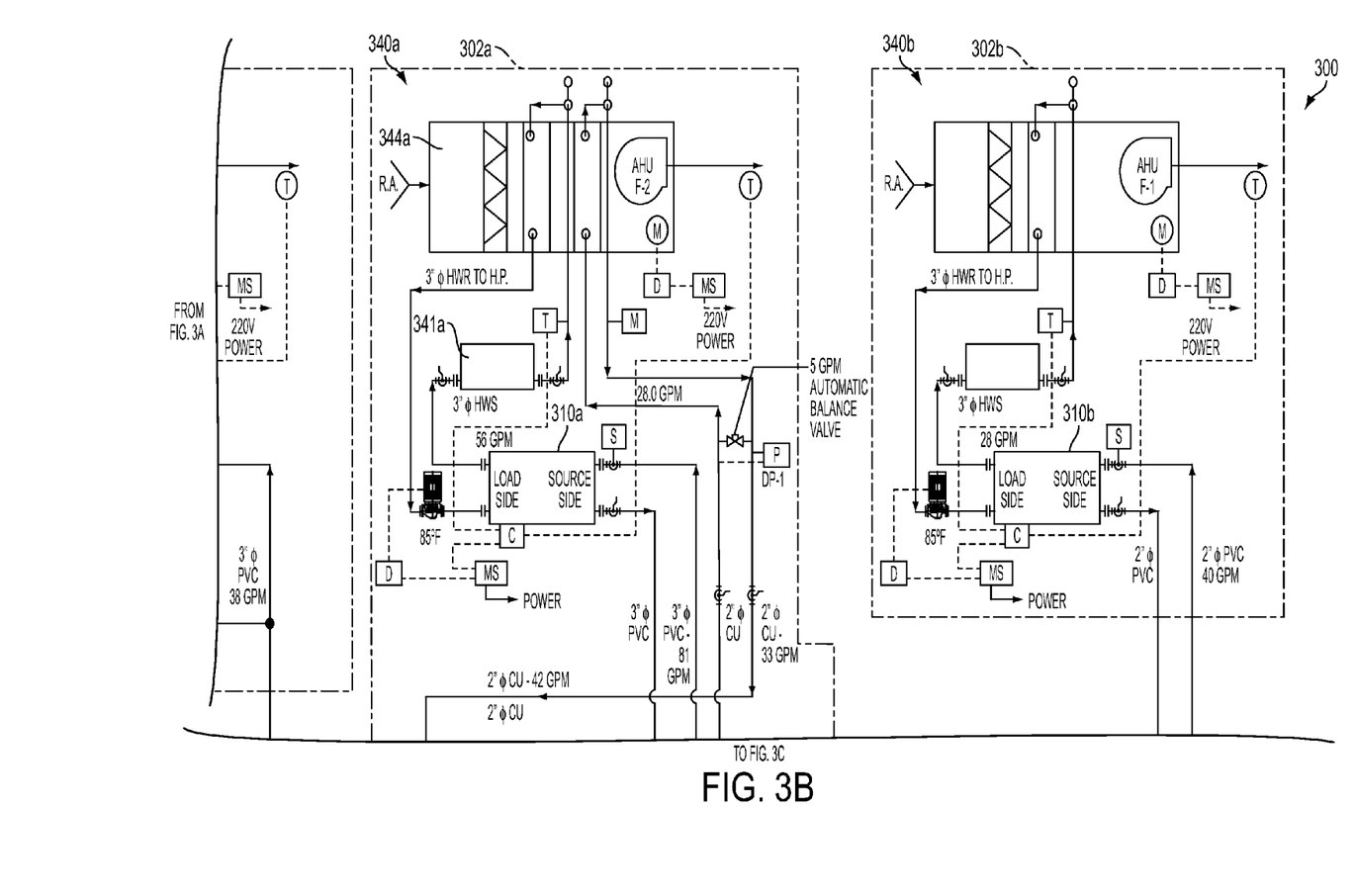
Figure 3C:
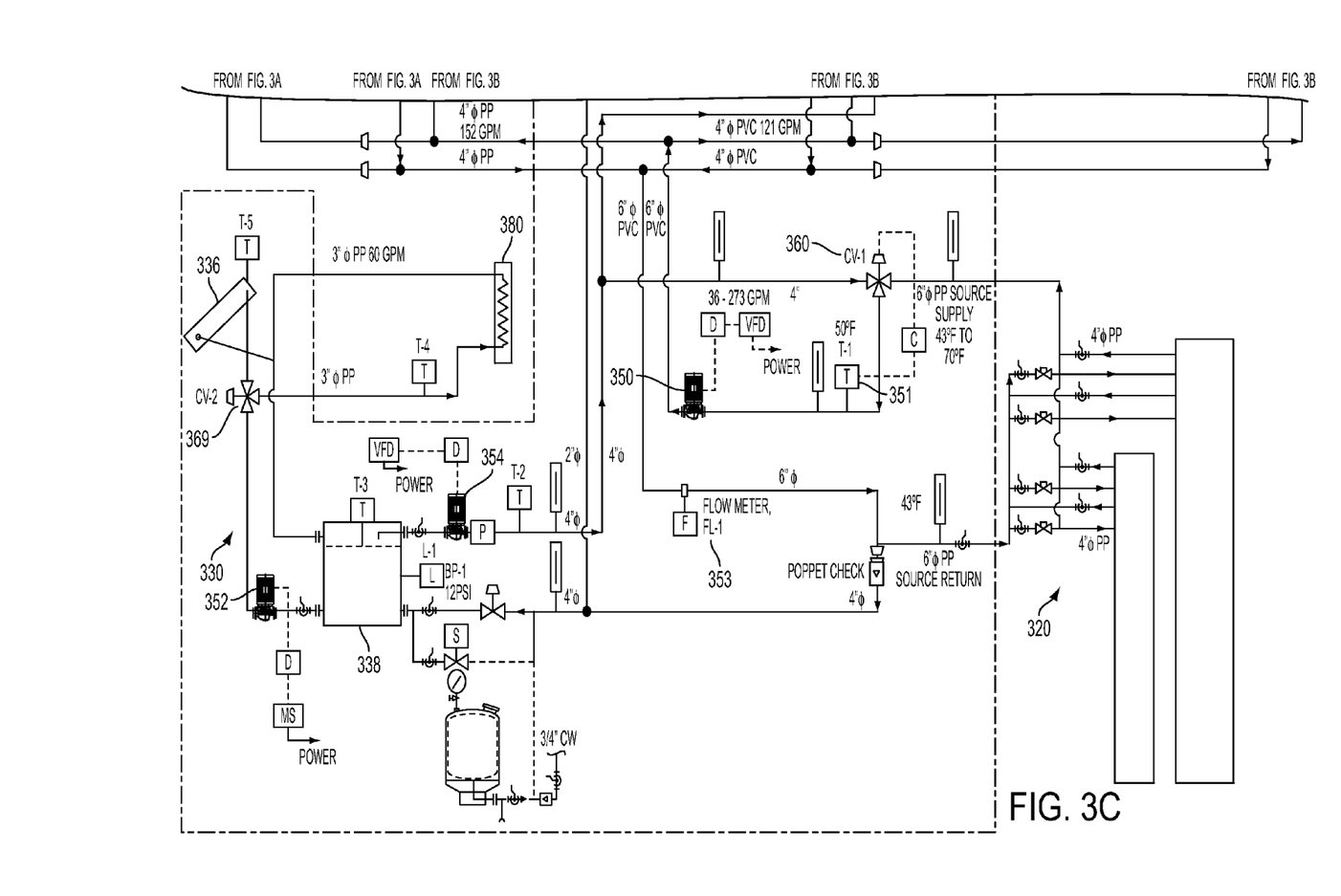

Referring to FIGS. 3A-3C, a hybrid heating and/or cooling system 300, consistent with a further embodiment, is shown and described. According to this embodiment, the hybrid heating and/or cooling system 300 includes multiple heat pumps 310a-310e and delivery systems 340a-340e coupled to a heat exchanger system 320 and solar heating system 330. The hybrid heating and/or cooling system 300 thus allows heating and/or cooling in multiple zones 302a-302d (e.g., in different buildings or in the same building). Each of the delivery systems 340a-340e may include heating and/or cooling equipment, such as air handler units (e.g., air handler unit 344a) and convection heating equipment (not shown). In this embodiment, buffer tanks (e.g., buffer tank 341a) may also be coupled to the heat pumps (e.g., heat pump 310a). In this embodiment of the hybrid heating and/or cooling system 300, the multiple heat pumps and air handlers may be operated independently in a heating or cooling mode, for example, to provide heating and cooling at different levels in different zones at the same time.

In this embodiment, the solar heating system 330 is coupled directly to at least one of the delivery systems (e.g., to air handler unit 344a) to provide the direct solar heating, for example, when the temperature in the storage tank 338 exceeds 160° F. This embodiment of the hybrid heating and/or cooling system 300 may also recover waste heat from air compressors, for example, using one or more compressed air energy recovery coils 380. This air compressor waste heat may be stored in the same storage tank 338 as the solar heat. The solar heating system 330 may include a pump 352 that operates when the temperature in either the solar collector(s) 336 or the recovery coil(s) 380 exceed the temperature in the storage tank 338 by a predetermined about (e.g., about 10° F. A diverter valve 369 may direct the water or working fluid from the tank 338 to the source with the higher temperature.

The hybrid heating and/or cooling system 300 may include a pump 350 that operates when any of the heat pumps 310a-310e is operating to provide the heat exchanger working fluid to operating the heat pumps 310a-310e. A control meter 351 may control the pump speed in accordance with the requirements of the heat pumps 310a-310e. A control valve 360 may control tempering of the heat exchanger working fluid with the solar heated working fluid to provide a desired temperature (e.g., about 50° F.), for example, measured at temperature monitor 353. A pump 354 may be operated to supply the solar heated working fluid.

Those skilled in the art will recognize the types of solar collectors, heat pump units, borehole heat exchangers, air handlers, baseboard heaters, peaking boilers, valves, pumps and other components that may be used in the system. Those skilled in the art will also recognize that the systems described above may be designed to provide only heating (i.e., without cooling). Although water is described as a working fluid in at least some of the systems described above, those skilled in the art will recognize that other working fluids may be used.

For a building having a heating and cooling system with optimized energy efficiency, an integrated hybrid application of solar, geothermal, and fuel-fired boiler energy sources may be arranged to provide building space heating in several modes for optimal efficiency, depending on the building load and coincident available natural and renewable energy sources. Although the exemplary system is described for heating and/or cooling a building, the system may also be used to heat and/or cool other spaces.

Figure 4:
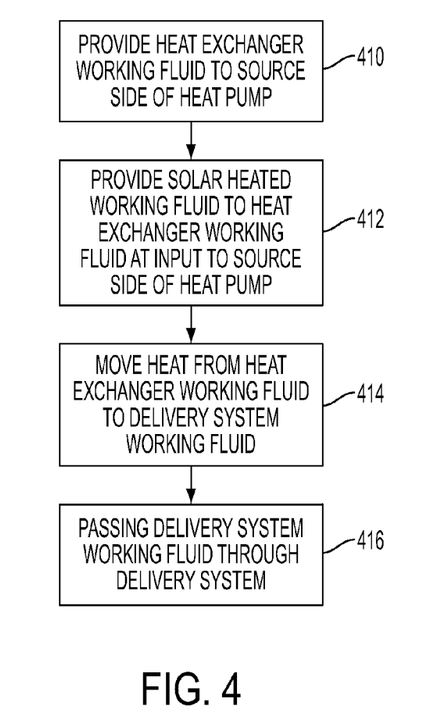
FIG. 4 is a flow chart illustrating a heating method, consistent with one embodiment of the present invention.
Figure 5:
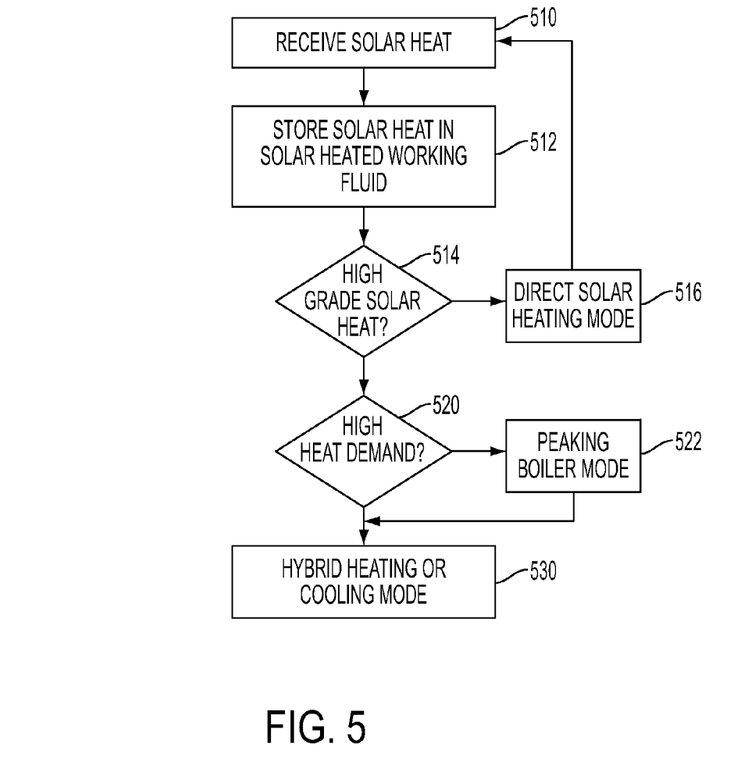
FIG. 5 is a flow chart illustrating a heating method including different heating modes, consistent with another embodiment of the present invention.

Referring to FIGS. 4 and 5, methods for operating hybrid heating and/or cooling systems, consistent with embodiments of the present invention, are described in greater detail. FIG. 4 illustrates one method of heating in a hybrid heating mode (e.g., a hybrid solar/geothermal mode). According to this method, heat exchanger working fluid is provided 410 to a source side of a heat pump and solar heated working fluid is provided 412 to the heat exchanger working fluid at the input to the source side of the heat pump. In the exemplary embodiment shown in FIG. 2, for example, a geothermal field source pump 250 draws warmed water from the borehole heat exchangers 224 and sends the water to the heat pump 210. The three-way valve 260 stabilizes the temperature to the heat pump 210 with low grade energy from the solar heat storage tank 238 via the solar heat storage pump 254.

The heat is moved 414 from the heat exchanger working fluid to the delivery system working fluid, for example, by operation of the heat pump 210. The delivery system working fluid is then passed 416 through the delivery system to provide heating. In the exemplary embodiment shown in FIG. 2, for example, the heat pump 210 sends low grade (e.g., 95° F.) heat to air handler(s) 244 and convection heating equipment (e.g., baseboard heaters 246) for normal heating. The pump 256 may then return the water or other delivery system working fluid to the heat pump 210, and the return working fluid may be tempered with three way valve 261 and solar storage heat pump 254 to keep heat pump 210 operating at or near its peak operating efficiency.

FIG. 4 illustrates one method of operating a hybrid heating and/or cooling system in different heating modes. According to this method, solar heat is received 510 and stored 512 in a solar heated working fluid. According to one method of solar energy collection in the exemplary embodiment shown in FIG. 2, when a control device 235 indicates solar collection is possible, solar pump 252 starts and draws water (or another working fluid) from the bottom of the solar energy storage tank 238 and passes the water across the piping header of heat pipe unit(s) 233 in the solar collector(s) 236 to pick up heat. The heated water returns to the top of the solar heat storage tank 238 to store the energy for later or current use. When the control device indicates solar energy collection is no longer available, the pump 252 shuts off and the water drains back to the energy storage tank 238. In one example, the solar collectors 236 may operate to maintain the solar heat storage tank 238 at a temperature of about 200° F. to 100° F. Direct solar heating with high grade heat may be available while the tank 238 maintains a temperature of about 200° F. to 160° F. Below 160° F. or as required by building design, the solar storage tank 238 may be available for low grade heat tempering of both the building heating return water (i.e., the delivery system working fluid) and/or the borehole heat exchanger source supply water (i.e., the heat exchanger working fluid) to maintain the heat pump 210 operation at or near its peak operating efficiency point, as described below.

If high grade solar heat is available and is needed 514, the method may include operating in a direct solar heating mode 516. In the exemplary embodiment shown in FIG. 2, for example, at times when the solar heat storage tank 238 is maintaining high grade heat (e.g., 160° F. or above), the compressors in the heat pump 210 may be locked out and the hot water (i.e., solar heated working fluid) passes directly into the delivery system 240. During direct solar heating mode, the hot water or other working fluid may be provided to the air handlers 244 and/or to the convection heating equipment 246.

If high grade solar heat is not available and there is a high heat demand 520, the method may include operating in a peaking boiler mode 522. Times of high heat demand may include, for example, morning warm up after night setback or extreme cold days during near design day heating loads. In the exemplary embodiment shown in FIG. 2, for example, the peaking boiler(s) 270 may be operated to provide high grade heat. During this mode, the isolation valves 264, 265 isolate the peaking boiler(s) 270 and convection loops pump(s) 258 from the remainder of the system so the heat pump 210 is allowed to continue to provide low grade heat at peak efficiency of the heat pump.

The hybrid heating and/or cooling system may also operate in a hybrid heating or cooling mode 530. The hybrid heating and/or cooling system may operate in the hybrid mode when not operating in the direct solar heating mode or the peaking boiler mode or may operate in the hybrid mode at the same time as operating in the direct solar heating mode or the peaking boiler mode. One example of a hybrid heating method is illustrated in FIG. 4 and described above.

According to one example of a cooling method, the heat pump operates in reverse mode to provide building ventilation cooling and to reject the heat removed to the ground source borehole heat exchangers. In the exemplary embodiment shown in FIG. 2, for example, the convection loops may be isolated with valves 266, 267 during operation in cooling mode (e.g., during summer). The heat pump 210 operates in reverse mode to extract heat from the air handler loop and deliver it to the geothermal loop. Heat is rejected into the cool borehole heat exchangers 224, allowing the heat pump 210 to cool the building more efficiently than if the building had to reject the heat to the warmer summer air.

The above methods/modes may be employed to optimize system efficiency of the hybrid solar/geothermal ventilation and space heating and cooling system. According to one example, energy for heating the building may be provided such that 55% comes from the heat exchangers, 11% comes from the electrical energy as work of compression in the heat pumps, 25% comes from solar and 9% comes from the fuel fired peaking boiler. While operating in the heating mode according to the exemplary embodiment, the heat pump may operate at an effective Coefficient of Performance (COP) between 7 and 8 and more specifically about 7.4. These exemplary percentages are a target based on a particular building model and will vary in degree with different building models, but are provided here as an example of likely energy source allocations and the magnitude attainable.

Embodiments of the hybrid heating and/or cooling system may advantageously provide cost effective, commercially viable utilization of renewable energy sources. Embodiments of the hybrid heating and/or cooling system may also advantageously reduce net fossil fuel usage including fuel used to generate electrical power for a net reduction of greenhouse gas production. One exemplary embodiment of the hybrid heating and cooling system is estimated to provide a decrease of direct fossil fuel usage on the order of 91% and to reduce total net $CO_2$ emissions on the order of 68% (assuming the increased electrical demand for heat pump operation was provided by electricity generated from fossil fuels).

Consistent with one embodiment, a system includes at least one heat pump including a source side and a load side. The heat pump is configured to move heat between the source side and the load side. The system further includes at least one heat exchanger coupled to the source side of the at least one heat pump, for providing a working fluid to the source side of the heat pump. The system may also include a heating energy storage system coupled to at least the source side of the at least one heat pump. The heating energy storage system may be configured to provide heat for tempering the working fluid passing into an input to the source side of the heat pump. The system may further include a delivery system coupled to the load side of the at least one heat pump.

Consistent with another embodiment, a method of heating includes providing heat exchanger working fluid from at least one heat exchanger to a source side of at least one heat pump; providing solar and/or waste energy heated working fluid to the heat exchanger working fluid at an input to the source side of the heat pump to temper the heat exchanger working fluid; moving heat from the tempered working fluid at the source side of the heat pump to a delivery system working fluid at a load side of the heat pump; and passing the delivery system working fluid from the load side of the heat pump through a delivery system.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system comprising:
at least one heat pump including a source side and a load side, the heat pump being configured to move heat between the source side and the load side;
at least one heat exchanger coupled to the source side of the at least one heat pump, for providing a working fluid to the source side of the heat pump;
a heating energy storage system coupled to at least the source side of the at least one heat pump, the heating energy storage system configured to provide heat for tempering the working fluid passing into an input to the source side of the heat pump; and
a delivery system coupled to the load side of the at least one heat pump; and
a solar heating system coupled to the source side of the at least one heat pump to provide heat for tempering the working fluid passing into the input to the source side of the heat pump and coupled to the load side of the at least one heat pump to provide heat for tempering a working fluid passing into an input to the load side of the at least one heat pump in a hybrid heating/cooling mode, and wherein the solar heating system is coupled to the delivery system to provide heat directly to the delivery system such that solar heated working fluid passes directly into the delivery system in a direct solar heating mode, and wherein the solar heating system is configured to pass the solar heated working fluid directly into the delivery system in the direct solar heating mode when a temperature of stored solar heat reaches a predetermined level.

2. The system of claim 1 wherein the at least one heat exchanger includes borehole heat exchangers configured to be positioned in geothermal wells for transferring heat to and/or from a geothermal source.

3. The system of claim 1 wherein the heat exchanger includes effluent heat exchangers configured to transfer heat to and/or from an effluent source.

4. The system of claim 1 wherein the solar heating system includes at least one solar collector and at least one solar heat storage.

5. The system of claim 1 wherein the delivery system includes at least one air handler coupled to the load side of the at least one heat pump, the at least one air handler being configured to heat and/or cool air.

6. The system of claim 5 wherein the delivery system includes convection heating equipment coupled to the load side of the at least one heat pump, the convection heating equipment being configured to receive a heated working fluid from the at least one heat pump to provide convection heating.

7. The system of claim 1 wherein the delivery system includes convection heating equipment coupled to the load side of the at least one heat pump and at least one boiler coupled to the convection heating equipment, the convection heating equipment being configured to receive a heated working fluid from the at least one boiler and/or from the at least one heat pump to provide convection heating.

8. The system of claim 1 wherein the heat pump is reversible and configured to operate in a cooling mode.

9. The system of claim 1 wherein the heat pump is configured to operate at an effective Coefficient of Performance (COP) between 7 and 8.

10. The system of claim 1 wherein the solar heating system comprises:
   a temperature monitor for monitoring the temperature of stored solar heat; and
   conduits, pumps, and control valves for causing solar heated working fluid to pass directly to the delivery system in the direct solar heating mode and for causing solar heated working fluid to pass to the source side and/or the load side of the heat pump for tempering the working fluid in the hybrid heating/cooling mode.

* * * * *